UNITED STATES PATENT OFFICE.

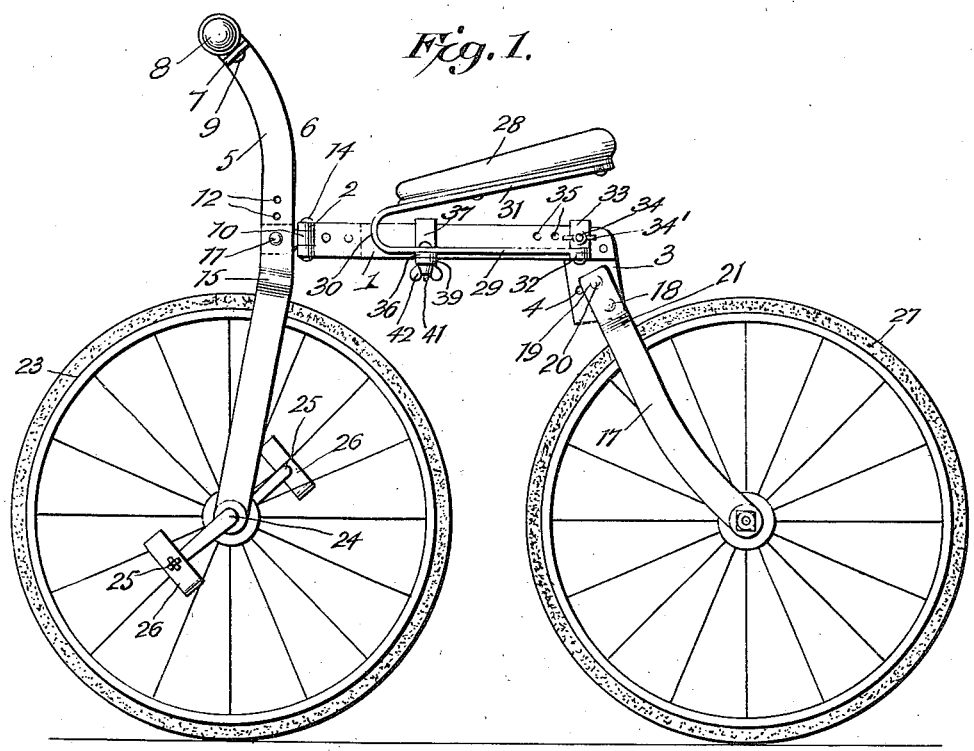
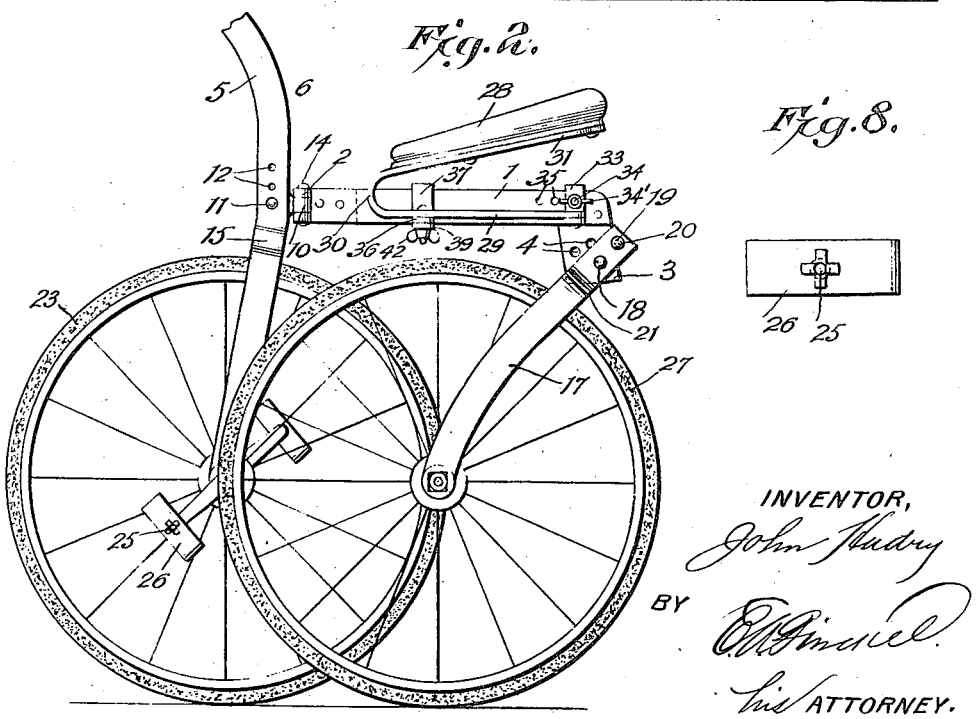

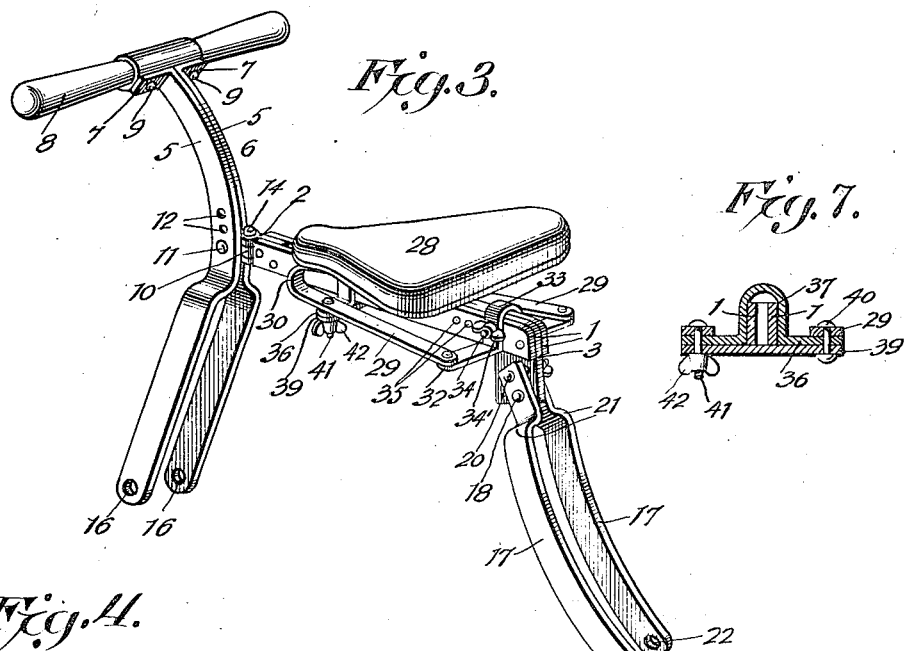
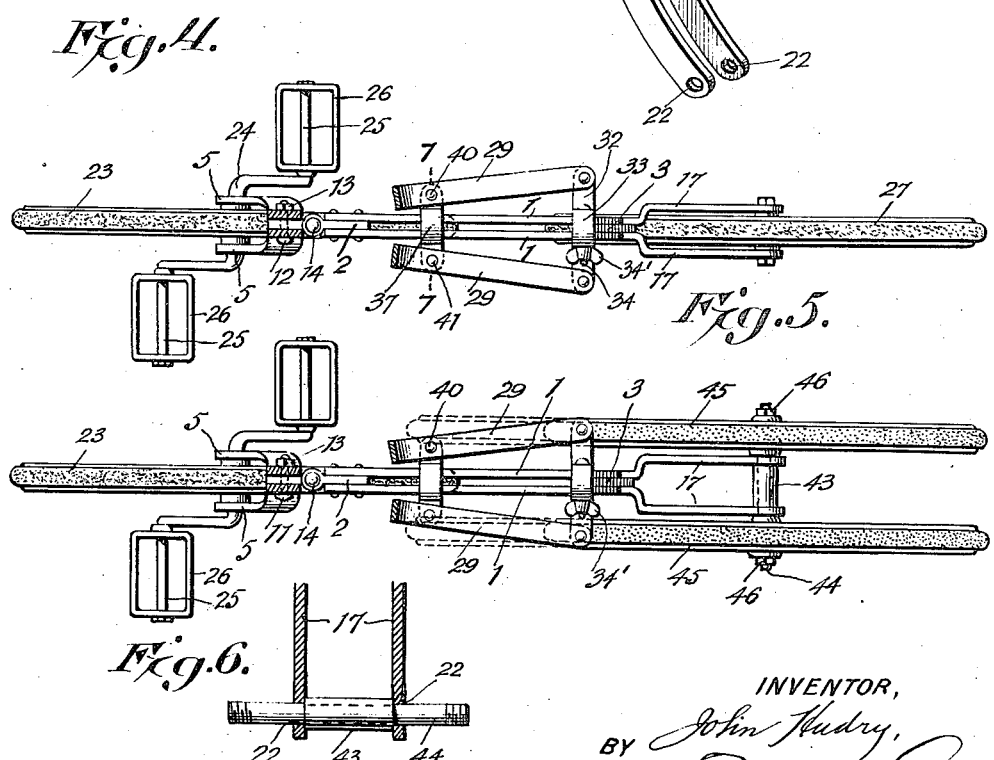

JOHN HUDRY, OF HAZLETON, PENNSYLVANIA.

VELOCIPEDE.

1,326,148.      Specification of Letters Patent.      Patented Dec. 23, 1919.

Application filed December 4, 1918. Serial No. 265,231.

*To all whom it may concern:*

Be it known that I, JOHN HUDRY, a citizen of the United States, and a resident of Hazleton, in the county of Luzerne and State of Pennsylvania, have invented a certain new and useful Improvement in Velocipedes, of which the following is a full, clear, and exact description.

This invention relates to bicycles or velocipedes for children.

The object of the invention is to provide a vehicle of this sort of simple, economical and durable construction, and which may be used either as a bicycle or two-wheel vehicle, or as a tricycle or three-wheel vehicle.

A further object of the invention is to construct the vehicle so that when used as a tricycle, the rear wheels may be adjusted or thrown forward, so that they will project in the path of the turning or steering movement of the front wheel, and thereby limit such movement of the front wheel, and thus serve to prevent the tilting of the vehicle by an excessive or too far turning of the front or steering wheel, when the vehicle is being used by a beginner, thus avoiding the falling of the child from the machine in attempting to learn to ride the vehicle.

A further object of the invention is to utilize the adjustability of the rear wheels for the purpose of folding the vehicle into small compass for storing and transportation purposes.

The invention consists in a velocipede, having a frame constructed of flat strips of metal, and comprising a front fork, a backbone, and a rear fork, the rear fork being adjustably connected with the backbone, so that it may be shifted either forwardly or backwardly; and in other details of construction of other parts of the vehicle, all substantially as I will proceed now more particularly to set forth and finally claim.

In the accompanying drawings, illustrating the invention, in the several figures of which like parts are similarly designated, Figure 1 is a side elevation of a bicycle with the parts in position of use. Fig. 2 is a side elevation of the bicycle of Fig. 1, with the rear wheel in folded or adjusted position, for purposes of storage or transportation. Fig. 3 is a perspective view of the frame, with the handle-bar and seat attached. Fig. 4 is a plan view of the bicycle, with the handle-bar and seat removed, the steering head and seat-supporting spring being shown in section, the handle-bar and seat being removed. Fig. 5 is a plan view of the vehicle converted into a three-wheel velocipede or tricycle, with the handle-bar and seat removed, the steering-head and seat-supporting spring being in section, and showing the rear wheels adjusted forwardly in dotted lines. Fig. 6 is a detail, partly in section and elevation, on a larger scale, of the rear fork and axle attachment for converting the machine from a bicycle into a three-wheel vehicle or tricycle. Fig. 7 is a section, on a larger scale, taken substantially in the plane of line 7—7, Fig. 4, of the seat clamp, and Fig. 8 is an end view, on a larger scale, of one of the pedals, showing the manner of securing it to the pedal shaft.

As shown in the drawings, the frame comprises a backbone constructed of two pieces or strips or bars of metal 1, arranged parallel to each other, and having riveted between their forward ends a hinge member 2, and also riveted between their rearward ends a bracket 3 projecting downwardly from the bars 1, and provided with a series of holes or perforations 4 arranged in an arc of a circle for a purpose presently to be described. A steering-head and front fork are also constructed of two strips or bars of metal 5 fitted closely together at their upper portions to form the steering-head 6, and having their upper ends bent outwardly, as at 7, to form a seat to which the handle-bar 8 is secured by means of rivets 9. A hinge member 10 is fitted between the members of the steering-head near its lower end, and the bars 5 of the steering-head and the hinge member 10 are securely bound together by a bolt 11 passing through one of a series of holes 12 in the bars and through the hinge member 10, and adapted to be tightened by a nut 13. The hinge member 10 is adapted to be connected with the hinge member 2 fixed in the backbone, by means of a pintle 14, thereby providing a hinge connection between the backbone and front fork and steering-head, whereby the vehicle may be steered. The members or bars 5, just below their connection with the backbone are bent outwardly, as at 15, and extend downwardly to form the wheel space for the front wheel, the said bars 5 at their lower extremities being provided with bearings 16 for the axle or pedal shaft upon which the front wheel is mounted. A rear fork is constructed of two like strips or bars 17 of sheet metal, pivoted near their upper ends to the bracket 3 by means of a rivet or bolt 18. At their upper ends just beyond the rivet 18, said bars 17 are provided with alined holes or perforations 19 to receive a removable bolt or other fastening 20, adapted to be passed through one of the series of holes 4 in the bracket 3, to lock the rear fork in adjusted positions. The bars or members 17 of the rear fork are bent outwardly, as at 21, and extend downwardly and are slightly curved rearwardly, to form wheel space for the rear wheel, and at their lower extremities are provided with bearings 22 for the axle of the rear wheel or wheels.

23 is the front wheel mounted in the front fork upon the crank-shaft 24, the pedal supporting members 25 of which are constructed of tubular material upon which the pedals 26 are loosely mounted, and in accordance with this invention, the pedals are locked upon the tubular members 25, by splitting the outer ends of the tubular members and bending the split portions outwardly against the cross-bar of the pedals, as shown more particularly in Fig. 8.

27 is the rear wheel mounted in the bearings of the rear fork upon a removable axle and locked therein by nuts in the usual manner.

28 is the seat, mounted upon a spring support, comprising two similar spring members, each constructed of a base portion 29 bent at its forward end, as at 30, and extended rearwardly to form spring members 31, upon which the seat is mounted. The base pieces or portions 29 are connected at their rear ends by means of a connecting piece 32 riveted thereto and bent upwardly at its center to form an arch 33 adapted to straddle the backbone, and provided with a removable fastening bolt 34 and nut 34' adapted to engage one of a series of holes or perforations 35 in the backbone, whereby the seat may be adjusted longitudinally of the machine. The base pieces or portions 29 are also connected at their forward ends by means of a connecting piece 36 also provided with a centrally bent up portion 37 to form an arch to straddle the backbone, and in order to lock the front portion of the seat support against upward displacement from the backbone the connecting piece 36 is provided with a locking strip 39 secured to the connecting piece and base piece 29 upon one side of the backbone, as by a rivet 40, and extending across the arch of the connecting piece under the backbone and secured to the connecting piece and base piece 29 upon the other side of the backbone by means of a removable bolt 41 and nut 42, thus affording a sliding connection between the front portion of the seat support and the backbone, whereby it is simply necessary to remove and replace the bolt 34 and nut 34' at the rear of the seat support, to effect an adjustment of the seat.

It will be observed that the rear connecting piece 32 of the seat support is longer than the front connecting piece 36, and that by this construction the spring members converge toward the front of the machine, whereby the springs afford a support somewhat conforming to the usual substantially triangular shaped seat, the springs engaging the seat in substantial parallelism with the rearwardly diverging sides of the seat and affording a proper support therefor to prevent them from sagging under the weight of the rider.

As shown in Fig. 5, the vehicle may be converted into a three-wheel vehicle, by simply removing the rear wheel and axle of the bicycle, and placing between the members of the rear fork and in alinement with the bearings therein, a tubular spacing member 43, and placing therein an axle 44 having its opposite ends threaded and projecting beyond the fork (see Fig. 6) and adapted to receive a pair of wheels 45, and applying nuts 46 to the ends of the axle to lock the wheels upon the axle.

In using the vehicle, if it be found that the reach from the seat to the pedals does not suit the length of the rider's legs, the backbone may be adjusted up or down by removing the bolt 11 and placing the hinge member or connection at one or the other of the holes 12 in the steering-head to get the proper adjustment, and then fastening the parts together in their adjusted position. So also, if the reach from the seat to the handle-bar does not suit the length of the rider's arms, so that he may occupy the machine in a comfortable position, the seat may be adjusted by removing the bolt 34 and nut 34', and moving the seat forward or backward to suit the conditions, and again replacing the bolt and nut in one or the other of the series of holes 35 in the backbone to lock the seat in its adjusted or proper position.

The seat and its support may be entirely removed from the machine, by removing the bolts and nuts 34, 34', and 41, 42, and swinging the strip 39 on its pivot to one side of the backbone, and lifting the seat and its support vertically from the backbone.

When the machine is converted into a three-wheel vehicle, and is to be used by a beginner, the rear wheels are thrown forwardly by removing the bolt 20 and moving the rear fork forwardly until the rear wheels overlap or extend into the path of the steering movement of the front wheel, as shown in dotted lines Fig. 5, so that the steering or sidewise movement of the front wheel will be limited and prevented from shifting too far around and thus avoiding the tilting or toppling over of the vehicle and throwing the child upon the ground.

When not in use, the machine may be folded by throwing the rear wheel or wheels forward to their fullest extent, as indicated in Fig. 2, and the bolt 20 fitted in the holes in the upper ends of the rear fork so as to engage the outer edge of the bracket 3, and thus locking the rear fork and the wheel or wheels in their adjusted or folded condition, and the machine conveniently transported or stored when in this folded condition.

I do not wish to be understood as limiting the invention to the exact details of construction herein shown and described, as the same may be changed in various particulars without altering the invention and still be within the scope of the claims herein.

What I claim is:

1. In a velocipede, a frame, comprising a front fork constructed of two like strips of metal secured together at their upper portions to form a steering head, and bent outwardly in opposite directions and extended downwardly to form wheel space, and provided with bearings in their lower ends for the pedal shaft and front wheel mounted thereon, a hinge member secured between said strips above and adjacent to said bends, a handle-bar secured to the upper ends of the strips, a backbone constructed of two like strips of metal having a hinge member riveted to their forward ends and connected with the hinge member in the front fork and steering head, a bracket riveted to the rear ends of said strips and extending downwardly therefrom, and a rear fork constructed of two like strips of metal riveted at their upper ends to said bracket and bent outwardly in opposite directions and extending downwardly to form wheel space and provided at their lower ends with bearings for the rear axle and wheel mounted thereon.

2. In a velocipede, a frame, comprising a front fork constructed of two like strips of metal secured together at their upper portions to form a steering head, and bent outwardly in opposite directions and extending downwardly to form wheel space, and provided at their lower ends with bearings for the pedal shaft and front wheel mounted thereon, a hinge member fitted between said strips above and adjacent to the outwardly bent portions thereof, and means for securing and adjusting said hinge member vertically between said strips, a handle-bar secured to the upper ends of the strips, a backbone constructed of two like strips of metal having a hinge member riveted thereto at their forward ends and connected with the hinge member in the front fork and steering head, a bracket riveted to the rear ends of said strips and extending downwardly therefrom, and a rear fork constructed of two like strips of metal riveted at their upper ends to said bracket and bent outwardly in opposite directions and extending downwardly to form wheel space and provided at their lower ends with bearings for the rear axle and wheel mounted thereon.

3. In a velocipede, a frame, comprising a front fork constructed of two like strips of metal secured together at their upper portions to form a steering head and bent outwardly in opposite directions and extending downwardly to form wheel space, and provided at their lower ends with bearings for the pedal shaft and wheel mounted thereon, a hinge member fitted between said strips above and adjacent to the outwardly bent portions thereof, and means for securing and adjusting said hinge member vertically between said strips, a handle-bar secured to the upper ends of the strips, a backbone constructed of two like strips of metal having a hinge member riveted to their forward ends and connected with the hinge member in the front fork and steering head, a bracket riveted between the rear ends of said strips and extending downwardly therefrom, and provided with a series of perforations, and a rear fork constructed of two like strips of metal riveted near their upper ends to said bracket and bent outwardly in opposite directions and extending downwardly to form wheel space and provided at their lower ends with bearings for the rear axle and wheel mounted thereon, the upper ends of said rear fork provided with perforations adapted to aline with one or the other of the series of perforations in said bracket, and a clamping bolt adapted to be passed through said alined perforations to lock the rear fork and the wheel mounted therein in adjusted positions.

4. In a velocipede, a front fork, a rear fork, and a backbone connecting said front and rear forks, a seat support, comprising base members adapted to be arranged upon opposite sides of the backbone and bent upwardly and extending rearwardly over said base members to form spring seat-supporting members, connecting pieces connecting the base members at their forward and rearward ends and provided with central arches adapted to straddle the backbone, a removable fastening bolt passing through one of said arches and one of a series of perforations in the backbone, and a pivoted locking strip extending across the other of said arches beneath the backbone.

5. In a velocipede, a front fork, a rear fork, and a backbone connecting said front and rear forks, a seat support, comprising base members adapted to be arranged upon opposite sides of the backbone and bent upwardly and extending rearwardly over said base members to form spring seat-supporting members, the said base members and seat-supporting members diverging rearwardly, connecting pieces connecting the base members at their forward and rearward ends and provided with central arches adapted to straddle the backbone, a removable fastening bolt passing through one of said arches and one of a series of perforations in the backbone, and a pivoted locking strip extending across the other of said arches beneath the backbone.

6. In a velocipede, a frame, comprising a front fork, a rear fork, and a backbone connecting said forks, a driving wheel mounted in the front fork, a rear wheel and axle therefor adapted to be removably mounted in bearings in the rear fork to form a bicycle, an additional axle adapted to be fitted in said rear fork, when the rear wheel and its axle are removed, and having its ends projecting beyond the opposite sides of the fork, and a pair of wheels adapted to be fitted upon the projecting ends of said axle on the outside of the fork, to thereby convert the bicycle into a tricycle.

7. In a velocipede, a frame, comprising a front fork, a rear fork, and a backbone connecting said forks, a driving wheel mounted in the front fork, a rear wheel and axle therefor adapted to be removably mounted in bearings in the rear fork to form a bicycle, a tubular spacer adapted to be arranged between the members of the rear fork in alinement with the bearings therein, when the rear wheel and its axle are removed, an additional axle adapted to be fitted in the rear fork and passing through the bearings and the tubular spacer and its ends projecting beyond the opposite sides of the fork, and a pair of wheels adapted to be fitted upon the projecting ends of the axle on the outside of the fork, to thereby convert the bicycle into a tricycle.

In witness whereof, I have hereunto set my hand this 30" day of November 1918.

JOHN HUDRY.

Witnesses:
   A. O. REINHART,
   W. C. DERSHUEL.